United States Patent
Wood, III et al.

(10) Patent No.: US 12,541,236 B2
(45) Date of Patent: Feb. 3, 2026

(54) SYSTEMS AND METHODS FOR DETERMINING ELECTRICAL CHARACTERISTICS OF POWER SUPPLY CABLE/S AND TAKING ONE OR MORE ACTIONS BASED ON SAME

(71) Applicant: DELL PRODUCTS L.P., Round Rock, TX (US)

(72) Inventors: Merle Wood, III, Round Rock, TX (US); Chin-Jui Liu, Luzhu (TW); Chi-Che Wu, Taipei (TW); Tsung-Cheng Liao, Taoyuan (TW); Wei-Cheng Yu, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 890 days.

(21) Appl. No.: 17/853,585

(22) Filed: Jun. 29, 2022

(65) Prior Publication Data
US 2024/0003985 A1   Jan. 4, 2024

(51) Int. Cl.
*G06F 1/26*    (2006.01)
*G01R 31/40*   (2020.01)
(Continued)

(52) U.S. Cl.
CPC ............. *G06F 1/263* (2013.01); *G01R 31/58* (2020.01); *G06F 1/266* (2013.01); *G06F 11/221* (2013.01);
(Continued)

(58) Field of Classification Search
CPC ........ G06F 1/263; G06F 1/266; G06F 11/221; G06F 11/3027; G06F 11/3058;
(Continued)

(56) References Cited

U.S. PATENT DOCUMENTS 7,436,149 B2   10/2008 Luo et al.
7,595,609 B2   9/2009 Wang
(Continued)

OTHER PUBLICATIONS

Saunders et al., "USB Promoter Group Announces USB Power Delivery Specification Revision 3.1", May 26, 2021, 2 pgs.
(Continued)

*Primary Examiner* — Thomas J. Cleary
(74) *Attorney, Agent, or Firm* — Egan, Enders & Huston LLP.

(57) ABSTRACT

Systems and methods that may be implemented to determine electrical characteristic/s of one or more power supply cable/s that are coupled to supply power from a power supply to a battery-powered information handling system, and to take one or more actions based on the determined electrical characteristic/s. The disclosed systems and methods may be so implemented to detect values of input voltage and input current that are provided from the power supply cable to a battery-powered information handling system, and to take one or more actions based on these detected values of input voltage and input current, such as power supply voltage compensation, protection of the power supply, alerts to the battery-powered information handling system, and/or warnings to a user of the battery-powered information handling system.

20 Claims, 7 Drawing Sheets

(51) Int. Cl.
  *G01R 31/58* (2020.01)
  *G06F 11/22* (2006.01)
  *H02J 7/00* (2006.01)
(52) U.S. Cl.
  CPC ...... *G01R 31/40* (2013.01); *G06F 2213/0042* (2013.01); *H02J 7/00712* (2020.01)
(58) Field of Classification Search
  CPC ...... G06F 2213/0042; G06F 1/28; G06F 1/30; G01R 31/40; G01R 31/50; G01R 31/58; H02J 7/00712
  See application file for complete search history.

(56) References Cited

U.S. PATENT DOCUMENTS

| | | | |
|---|---|---|---|
| 8,154,255 B2 | 4/2012 | Wang et al. | |
| 9,466,974 B2 | 10/2016 | Hsieh et al. | |
| 9,496,932 B1 | 11/2016 | Prendergast et al. | |
| 9,906,143 B1 | 2/2018 | Yu et al. | |
| 10,084,266 B1* | 9/2018 | Tsao | B60L 53/18 |
| 11,119,142 B1* | 9/2021 | Gaide | G01R 31/58 |
| 11,442,519 B1 | 9/2022 | Yu et al. | |
| 2008/0252307 A1* | 10/2008 | Schindler | G06F 1/266 |
| | | | 324/691 |
| 2013/0127481 A1* | 5/2013 | Vladan | G01R 27/16 |
| | | | 324/713 |
| 2015/0362944 A1* | 12/2015 | Sporck | H02M 1/00 |
| | | | 323/303 |
| 2016/0164322 A1* | 6/2016 | Li | H02J 7/00 |
| | | | 320/137 |
| 2018/0109118 A1* | 4/2018 | Sun | H02J 7/04 |
| 2018/0239410 A1* | 8/2018 | Paparrizos | H02J 7/00036 |
| 2018/0270750 A1* | 9/2018 | Coleman | H04B 1/1607 |
| 2019/0087295 A1* | 3/2019 | Sultenfuss | G06F 11/2733 |
| 2021/0048849 A1* | 2/2021 | Lee | G06F 1/1632 |
| 2021/0225159 A1 | 7/2021 | Grobelny et al. | |
| 2021/0333200 A1* | 10/2021 | Meehan | A61B 5/14552 |
| 2022/0327065 A1* | 10/2022 | Ghosh | G06F 13/102 |

OTHER PUBLICATIONS

Intel, "12th Generation Intel Core Processors", Datasheet, May 2022, 208 pgs.
"USB Charger (USB Power Delivery)", Obtained From Internet Jun. 5, 2022, 4 pgs.
Wikipedia, "USB-C", Obtained From Internet Jun. 6, 2022, 15 pgs.

* cited by examiner

SYSTEMS AND METHODS FOR DETERMINING ELECTRICAL CHARACTERISTICS OF POWER SUPPLY CABLE/S AND TAKING ONE OR MORE ACTIONS BASED ON SAME

FIELD

This invention relates generally to information handling systems and, more particularly, to power supply cables for information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

AC adapters for information handling systems employ both attached and detachable power supply cables for delivering DC power to a battery-powered information handling system. An attached power supply cable is permanently affixed and connected to the power output circuitry of an AC adapter, e.g., so that it is not detachable by a system end user. A detachable power supply cable is configured to be temporarily connected to a DC power output connector of an AC adapter so that it may be later disconnected without physical damage to the power supply cable or connector, e.g., in a manner that allows a system end user to detach and re-attach the power supply cable at will from the DC power output connector of the AC adapter.

An original equipment manufacturer (OEM) of an information handling system typically supplies an attached or detachable power supply cable that is approved (or certified) for use with a mating AC adapter that is approved (or certified) for powering the system. An approved power supply cable is typically selected by the OEM to meet electrical power-handling requirements and any data communication requirements for the system and AC adapter. For example, an approved power supply cable may be configured to meet requirements of Universal Serial Bus (USB) Type C and USB power delivery (PD) standards, such as described in USB 3.2 Revision 1.1 specification and other specifications available from USB IF, Inc.

In the case of an AC adapter configured for use with a detachable power supply cable, an end user is free to use non-approved third party-supplied power supply cables with the AC adapter, including power supply cables having extended lengths. Such third party cables may not be approved by the OEM and/or may not meet electrical power-handling requirements, e.g., such as requirements of USB PD standards. If an end-user uses a third party power supply cable having high electrical resistance to connect an approved AC adapter to an information handling system, system operation quality may suffer due to risk of malfunction or inconsistent operation such as unintended disconnection of power suppled from the AC adapter to the information handling system and/or an occurrence of a safety incident such as burn out of the power supply cable conductor. For example, a non-approved extended length (e.g., 2 meter long) power supply cable may cause disconnection of power supplied from an AC adapter due to a voltage drop at the system side of the power supply cable, e.g., when the system is pulling power from the AC adapter and the system side voltage level drops below the system PD under-voltage protection (UVP) protection threshold. This in turn results in system non-charging and battery discharge.

In the case of an AC adapter (or computer docking station) configured with an attached power supply cable, the DC power conductor of the power supply cable or its connectors can be broken or damaged after long-term use. It is also possible for an end user to attach a USB Type C cable extender that is not intended to carry high currents to an attached power supply cable of an AC adapter or docking station. Both of these scenarios can result in the same quality loss, inconsistent behavior, and safety concerns as previously described for detachable power supply cables.

SUMMARY

Disclosed herein are systems and methods that may be implemented in real time to determine electrical characteristic/s of one or more power supply cable/s that are coupled to supply power from a power supply to a battery-powered information handling system, and to take one or more actions based on the determined electrical characteristic/s. The disclosed systems and methods may be so implemented in one embodiment to detect values of input voltage and input current that are provided from the power supply cable to a battery-powered information handling system, and to take one or more actions based on these detected values of input voltage and input current, such as power supply voltage compensation, protection of the power supply, alerts to the battery-powered information handling system, and/or warnings to a user of the battery-powered information handling system.

In one embodiment, the disclosed systems and methods may be implemented during operation of a power supply (e.g., AC adapter and/or an intervening device such as computer docking station) and a coupled battery-powered information handling system (e.g., notebook computer, MP3 player, personal data assistant (PDA), cell phone, smart phone, cordless phone, tablet computer, "2-in-1" or convertible computer, etc.) to detect real time electrical characteristics (e.g., current, voltage, cable resistance, voltage drop, etc.) across one or more power supply cable/s (e.g., USB Type C power supply cable/s) coupled between the power supply and the information handling system. Examples of actions that may be taken based on the detected electrical characteristics include, but are not limited to, power supply voltage compensation actions, power supply protection actions, actions to alerts the battery-powered information handling system, actions to warn a user of the battery-powered information handling system, etc.

In one exemplary embodiment, the disclosed systems and methods may be implemented in real time by at least one programmable integrated circuit of an information handling system to measure stable values of both input voltage and input current of DC input power provided at the information handling system side (system end) of one or more power supply cable/s while a power supply is operating to supply a temporarily lowered input DC input power to an opposing power supply side (power supply end) of the power supply cable/s, and to also retrieve or otherwise determine the electrical resistance of a system side input power path within the information handling system that receives the DC input power from the power supply cable/s.

The measured resistance value of the system side power path may be provided together with the measured system side input voltage value and system side input current value across a data communication bus of the power supply cable/s to at least one programmable integrated circuit of the power supply.

In some embodiments, the disclosed systems and methods may be implemented utilizing a combination of programmable integrated circuits of the information handling system and the power supply to determine or measure real-time DC resistance of an attached or detachable power supply cable, and to determine if this measured DC resistance is within an expected and acceptable specified DC resistance range required to safely and reliably handle the desired output current power profile (e.g., USB PD power profile) of the power supply. In some embodiments, the disclosed systems and methods may be implemented to control the power supply to compensate for a power supply cable voltage drop due to measured excessive DC resistance (DCR) of the power supply cable so as to deliver more power to the information handling system than would otherwise be possible without this voltage compensation. In this way, the disclosed systems and methods may be implemented to detect increased DC resistance resulting from a power supply cable that is aged or broken (or that has aged or broken connectors), and to then adjust the power supply output current (and power) lower as necessary to ensure safe and reliable information handling system and power supply operation.

In some embodiments, the disclosed systems and methods may be implemented to provide a warning to a user of the information handling system that notifies the user of the presence of an incorrect, damaged or aged power supply cable when detected. In this way, the disclosed systems and methods may be implemented to combine foreseeing voltage regulation at the end-cable of the power supply cable failing in dynamic load and providing displaying a popup warning message to the user screen or other user warning, e.g., to prevent the end-user from employing a very long DC power supply cable (such as a power supply cable having a length from greater than 1.8 meters up to 3 meters long).

In some embodiments, the disclosed systems and methods may be implemented in a similar fashion to measure DC resistance of multiple power supply cables and/or other power supply circuitry coupled in series between a power supply and an information handling system, e.g., such as in the case where a computer docking station is coupled in series between the power supply and the information handling system by multiple power supply cables, where the power supply is coupled to the information handling system by multiple power supply cables coupled together in series between the power supply and the information handling system, etc.

In one exemplary embodiment, at least one programmable integrated circuit of a power supply may calculate a value of real time DC cable resistance of connected power supply cable/s from measured values of system side input voltage, system side input current, and system side power path resistance that are received as described above across a communication bus of the power supply cable/s from the at least one programmable integrated circuit of an information handling system. The at least one programmable integrated circuit of the power supply may then take one or more actions on the power supply side of the power supply cable based on the calculated value of real time DC cable resistance of the power supply cable/s.

Specific examples of power supply side actions that may be taken in this embodiment by the programmable integrated circuit of the power supply include, but are not limited to, providing full-rated DC current across the intervening power supply cable/s to the information handling system (in the case where the calculated DC cable resistance value of the power supply cable/s is within an expected cable resistance value range, current rating, etc. of the power supply cable/s as specified by a power supply cable specification and/or regulatory specification for the power supply cable such as specified by an electronic marker chip (E marker) within a power supply cable rated to handle greater than or equal to 3 amps current, or a non-E marker power supply cable rated to handle less than 3 amps current), performing real time DC voltage compensation based on the calculated DC cable resistance value and DC current output across the power supply cable/s as needed to prevent under-voltage protection (UVP) circuitry of the information handling system from disconnecting power to the information handling system due to low voltage at the output (system side) of the power supply cable/s (in the case where the calculated DC cable resistance value is greater than an expected cable resistance value range specified by a power supply cable specification and/or regulatory specification for the power supply cable such as specified by an E marker or non-E marker of the power supply cable) by switching to a lower power and lower current profile by reporting new source capabilities to the information handling system, providing an alert message to the information handling system together to prevent a potential safety issue (in the case where the calculated DC cable resistance value is greater than an expected cable resistance value range specified by a power supply cable specification and/or regulatory specification for the power supply cable such as specified by an E marker or non-E marker of the power supply cable), etc.

By performing real time DC voltage compensation as described above to prevent under-voltage protection (UVP) circuitry of the information handling system from disconnecting power to the information handling system due to low voltage at the output (system side) of the power supply cable/s, the disclosed systems and methods may advantageously compensate for cable power loss, resulting in more power for system and battery charge power, leading to faster battery charge times. Moreover, the current/power profile may be downsized to report an utilize a lower adapter power source capability in order to allow continued safe use of the information handling system with a power supply cable having greater than expected electrical resistance (in the case where the calculated DC cable resistance value is greater than an expected cable resistance value range specified by a power supply cable specification and/or regulatory specification for the power supply cable such as specified by an E marker or non-E marker of the power supply cable).

In one respect, disclosed herein is a method, including: measuring stable values of input voltage and input current of a direct current (DC) input power provided to a battery-powered information handling system across one or more power supply cables; using the measured stable values of the input voltage and the input current to determine real time electrical characteristics of the one or more power supply cables that are providing the DC input power to the battery-powered information handling system; and taking one or more actions based on the one or more determined electrical characteristics.

In another respect, disclosed herein is a system, including: a battery-powered information handling system electrically coupled to receive direct current (DC) input power from a power supply across one or more power supply cables; where the battery powered information handling system includes at least one first programmable integrated circuit programmed to measure stable values of input voltage and input current of the DC input power provided to the battery-powered information handling system across the one or more power supply cables; where the power supply includes at least one second programmable integrated circuit programmed to use the measured stable values of the input voltage and the input current to determine real time electrical characteristics of the one or more power supply cables that are providing the DC input power to the battery-powered information handling system; and where at least one of the first programmable integrated circuit or second programmable integrated circuit is programmed to take one or more actions based on the one or more determined electrical characteristics.

DESCRIPTION OF ILLUSTRATIVE EMBODIMENTS

Figure 1:
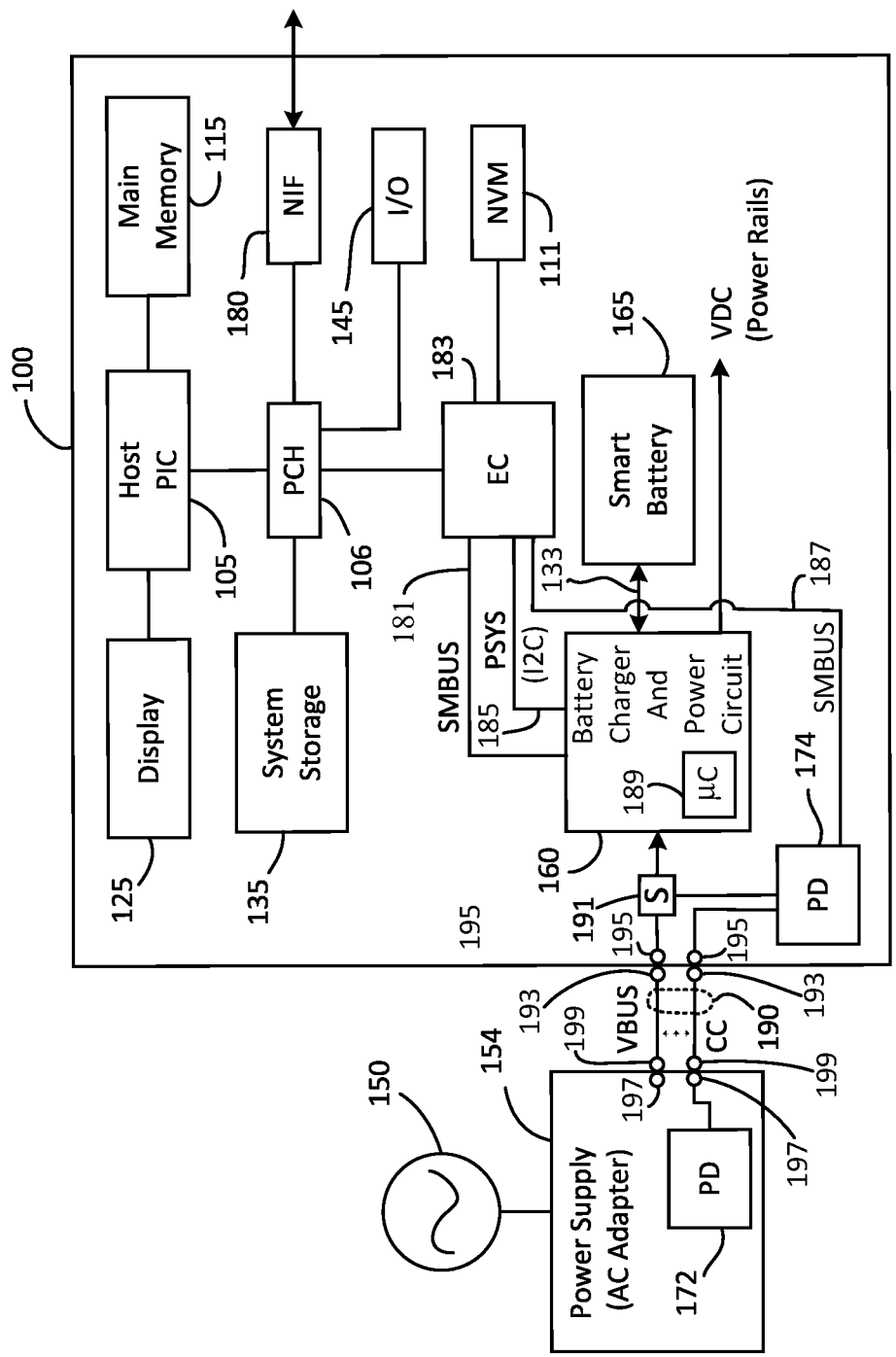
FIG. 1 illustrates a block diagram of an information handling system coupled to a power supply according to one exemplary embodiment of the disclosed systems and methods.

FIG. 1 is a block diagram of a battery-powered information handling system 100 (e.g., mobile portable information handling system such as notebook computer, MP3 player, personal data assistant (PDA), cell phone, smart phone, cordless phone, tablet computer, "2-in-1" or convertible computer, etc.) as it may be configured with various components within an outer chassis enclosure (e.g., tablet computer body or smartphone body, hinged notebook computer base, etc.) according to one exemplary embodiment of the disclosed systems and methods. It will be understood that the embodiment of FIG. 1 is exemplary only, and that other in other embodiments an information handling system may include additional, fewer and/or alternative components suitable for a given application including other programmable integrated circuits such as discrete graphics processing units (GPUs), etc.

As shown in FIG. 1, information handling system 100 of this exemplary embodiment includes a host processing device or host programmable integrated circuit (PIC) 105 (e.g., CPU such as an Intel Pentium series processor, an Advanced Micro Devices (AMD) processor or one of many other processors currently available) coupled to a platform controller hub (PCH) 106. Other examples of programmable integrated circuits 105 include any other suitable one or more programmable integrated circuits such as controller, microcontroller, microprocessor, ASIC, programmable logic device "PLD" such as FPGA, complex programmable logic device "CPLD", etc.

In the illustrated embodiment, host programmable integrated circuit 105 may be configured to execute an operating system (OS) such as Windows-based operating system, Linux-based operating system, etc. System memory 115 (e.g., DRAM) may be coupled as shown to host programmable integrated circuit 105, and a display device 125 (e.g., LED or LCD display monitor) may be coupled to an integrated graphics processing unit (i-GPU) of host programmable integrated circuit 105 to display visual images (e.g., via graphical user interface) to the user. System storage 135 (e.g., hard disk drive, solid state drive, etc.) may be coupled as shown to host programmable integrated circuit 105 via PCH 106 to provide permanent or non-volatile storage for information handling system 100.

Still referring to FIG. 1, input/output (I/O) devices 145 (e.g., such as a keyboard, touchpad, mouse, etc.) may be coupled via PCH 106 to host programmable integrated circuit 105 to enable the user to interact with the information handling system. In other mobile applications, such as convertible computer, tablet computers and smart phones, a touchscreen may additionally or alternatively be provided for both presenting a graphical user interface (GUI) and for accepting user input. An embedded controller (EC) 183 (e.g., including a programmable integrated circuit such as microcontroller or other processor) may also be coupled to PCH 106 as shown, and may be configured to participate in performance of various tasks such as battery and/or power management, I/O control, etc. Non-volatile memory 111 (e.g., embedded and partitioned flash memory, Electrically Erasable Programmable Read Only Memory—EEPROM, etc.) may be coupled to EC 183 for storing persistent information for EC 183.

In FIG. 1, a network interface (NIF) device 180 may be coupled as shown to host programmable integrated circuit 105 via PCH 106 to enables wired and/or wireless communication with one or more remote network devices or systems across an external network (e.g., wired or wireless local area network, the Internet or a corporate intranet, etc.). In one embodiment NIF 180 may be a network interface controller (NIC), and in another embodiment NIF 180 may also include an optional radio module having at least one antenna element coupled to the radio module for wireless LAN or cellular reception and transmission.

In the embodiment of FIG. 1, information handling system 100 is coupled to an external power supply 154 (e.g., AC adapter) by a power supply cable 190 (e.g., USB Type C cable) that includes multiple electrical conductors (or "lines"), e.g., in this embodiment at least one DC power conductor (Vbus) and at least one data communication bus conductor (CC) as shown (together with a ground conductor). Power supply 154 is in turn coupled to receive AC power from AC mains 150 and to provide DC power to information handling system 100 across the Vbus conductor of power supply cable 190. In this embodiment, power supply cable 190 is a detachable power supply cable (e.g., USB Type C power supply cable) that is mechanically separable from power supply 154 at mating connectors 197/199 (e.g., USB Type C connectors) and that is also mechanically separable from information handling system 100 at mating connectors 193/195 (e.g., USB Type C connectors). In this way, detachable Power supply cable 190 is configured to be temporarily connected to power supply 154 via the mating connectors 197/199 and temporarily connected to information handling system 100 via the mating connectors 193/195 so that power supply cable 190 may be later disconnected without physical damage to the power supply cable 190 or either of connectors 197/199 and 193/195, e.g., in a manner that allows an information handling system end user to detach and re-attach the power supply cable 190 at will from power supply 154 and/or information handling system 100. However, in other embodiments, a power supply cable 190 may be an attached power supply cable that is permanently affixed and connected to the power output circuitry of power supply 154, e.g., so that it is not detachable from the power supply 154 by the information handling system end user.

Still referring to FIG. 1, DC power conductor (Vbus) provides DC power received from power supply cable 190 via connectors 193/195 to input power circuitry of information handling system 100 that includes switch circuit 191 (e.g., one or more metal oxide semiconductor field effect transistors "MOSFETs") which regulates supply of DC input power to battery charger/power circuit (charger) 160 of information handling system 100 that includes a charger microcontroller 189 programmed to execute logic to perform charger tasks described herein, and that is under the control of system-side power delivery programmable integrated circuit 174 (e.g., such as USB Type C power delivery (PD) microcontroller or state machine). In this exemplary embodiment, the input circuitry of information handling system 100 provides this input DC power to battery charger/power circuit 160 of information handling system 100 to give information handling system 100 a source of DC power (e.g., up to a DC power corresponding to a system charger input current limit value that is based on a power/current profile previously provided from power supply-side PD integrated circuit 172 to system-side PD integrated circuit 174) to supplement or replace other DC power provided by battery cells of a battery 165 (e.g., such as self-contained lithium ion ("Li-ion") or nickel metal hydride ("NiMH") smart battery pack. Such a smart battery pack may include, for example, one or more rechargeable battery cells and a battery management unit (BMU) in the form of an analog front end ("AFE") coupled to a microcontroller or other programmable integrated circuit. Battery charger/power circuit 160 of information handling system 100 may also provide DC power for recharging battery cells of the battery system 165 during charging operation. Further information on configuration and operation of battery-powered information handling systems, smart battery packs, charge/discharge FETs, and BMUs may be found, for example, in United States Patent Application Publication Number 2021/0225159, U.S. Pat. Nos. 7,595,609, 7,436,149, 8,154,255, and 9,496,932, each of which is incorporated herein by reference in its entirety for all purposes.

As further shown in FIG. 1, a data bus (e.g., SMBus) 181 may be coupled between battery charger/power circuit 160 and EC 183 to allow battery charger/power circuit 160 to provide information to EC 183. Examples of such information include, but are not limited to, stable Vbus input voltage and Vbus input current measured by battery charger/power circuit 160. Also shown is a data communication bus 185 (e.g., $I^2C$ communication bus) that is coupled transmit platform (or system) power (Psys) signal between battery charger/power circuit (i.e., charger) 160 and EC 183 to allow battery charger/power circuit 160 to provide real time value of total platform or system power consumption of information handling system 100 to EC 183 in the Psys signal across $I^2C$ communication bus 185.

In one embodiment, when a battery 165 of information handling system 100 is optionally provided as a replaceable smart battery pack, it may be configured for insertion and removal from a corresponding battery pack compartment defined within the chassis of the information handling system 100 (e.g., such as plastic and/or metal enclosure of a notebook computer, tablet computer, convertible computer smart phone, etc.), and may be provided with external power connector terminal/s for making temporary electrical interconnection with mating power connector terminal/s within the battery pack compartment to provide power 133 to the system load (i.e., power-consuming components) of information handling system 100 via battery charger/power circuit 160 and one or more DC power rails 166. The external power connector terminal/s of battery 165 may also receive power 133 from battery charger/power circuit 160 for charging battery 165. In some embodiments, battery 165 may be permanently connected to deliver power 133 to, and receive power 133 from, battery charger/power circuit 160.

Figure 2A:
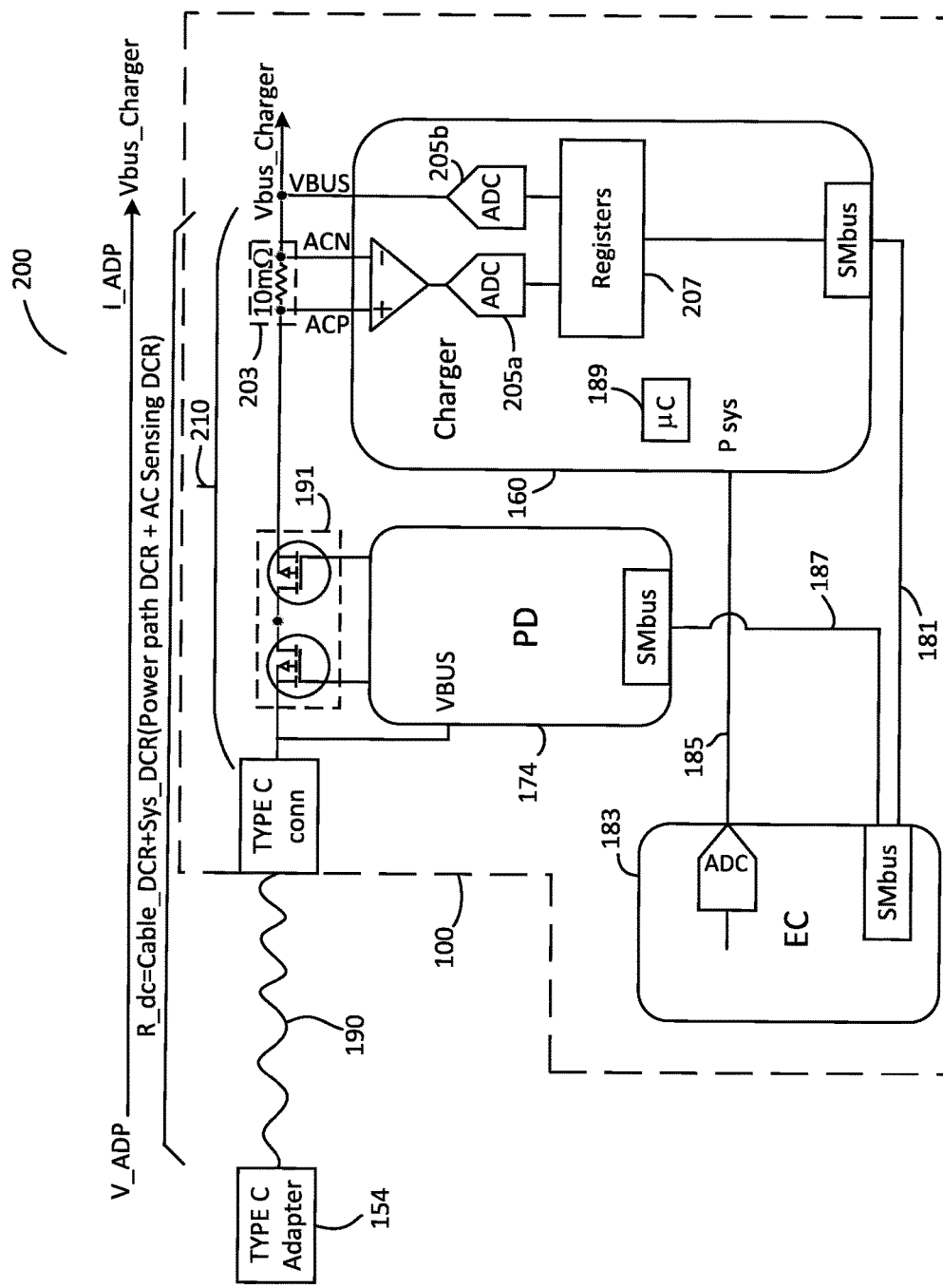
FIG. 2A is a block diagram illustrating selected components of an information handling system coupled by power supply cable to a power supply according to one exemplary embodiment of the disclosed systems and methods.

FIG. 2A is a block diagram illustrating one exemplary embodiment 200 of selected components of information handling system 100 as they may be coupled by power supply cable 190 (e.g., having a length of 1.8 meters or longer) to power supply 154, in this case a USB Type C AC adapter. As shown in FIG. 2A, battery charger/power circuit (charger) 160 includes an integrated high-resolution analog-to-digital converter (ADC) 205*a* to capture real time value of incoming AC adapter current (I_ADP) from the Vbus conductor/s of power supply cable 190 as measured across current-sense resistor 203, an integrated high-resolution ADC 205*b* to measure and capture real time value of the DC voltage of Vbus conductor/s of the power supply cable 190 as measured at the charger (Vbus_charger), and integrated buffer (registers) 207 to store these captured real time values of I_ADP and Vbus_charger in run-time. In this embodiment, a voltage drop from AC adapter 154 to the charger 160 of the information handling system 100 with associated AC input current is caused by the combined series resistance of the Vbus conductor/s and connector/s of the power supply cable 190 and the input power path 210 of information handling system 100.

In the exemplary embodiment of FIG. 2A, charger 160 operates to measure stable values of input voltage (Vbus_charger) and input AC adapter current data (I_ADP) from the power supply cable 190 as described further herein, and provides this measured stable input voltage (Vbus_charger) and AC adapter current (I_ADP) data from the buffer registers 207 of charger 160 to the EC 183 of information handling system 100 across SMBus 181. Charger 160 also provides a known value of the resistance of input power path 210 (SYS_DCR) of information handling system 100 across SMBus 181 to EC 183. This known SYS_DCR value of the resistance of input power path 210 may be predetermined (e.g., in a system manufacturer's laboratory) and stored, for example, in a non-volatile memory of charger 160. EC 183 then provides (or relays) these stable values of Vbus_charger and I_ADP, and the resistance value (SYS_DCR) of the input power path 210, across SMBus 187 to the system-side power delivery programmable integrated circuit 174, in this case a USB Type C PD microcontroller.

Still referring to FIG. 2A, USB Type C PD microcontroller 174 then sends a series of successive real time values of I_ADP, Vbus_charger, and input power path resistance to the AC adapter 154 as real time data through the CC conductor of power supply cable 190 to power supply-side power delivery (PD) programmable integrated circuit 172, e.g., which may include a microcontroller for performing operations thereof. The power supply-side power delivery (PD) programmable integrated circuit 172 then uses this received real time data to calculate the resistance of the Vbus conductor/s of the power supply cable as described further herein. It will be understood that in other embodiments another programmable integrated circuit on the system side besides EC 183 (e.g., such as a CPU chipset of Host PIC 105 and/or PD 174) may acquire and relay values of input voltage (Vbus_charger) and input AC adapter current data (I_ADP) to the system-side power delivery programmable integrated circuit 174, e.g., which may include a microcontroller for performing operations thereof. One example type of controller that may be employed for each of power supply-side PD programmable integrated circuit 172 and system side PD programmable integrated circuit is a Weltrend WT6630P Integrated USB Power Delivery (USB PD) Controller available from Weltrend Semiconductor Inc. of Hsinchu, Taiwan.

In one embodiment, EC 183 may monitor real time value of platform (or system) power (Psys) across I²C communication bus 185 and use this monitored value of system power from the Psys signal as a basis to adjust input current limit of charger 160 as required to ensure that the charger 160 measures stable values of input voltage (Vbus_charger) and AC adapter current (I_ADP) data. In this regard, the normal current/power demand from power-consuming components of information handling system 100 may be very dynamic and lead to unstable inconsistent/inaccurate input voltage (Vbus_charger) and AC adapter current (I_ADP) data readings during normal system operation at a normal higher charger input current limit value.

Figure 4:
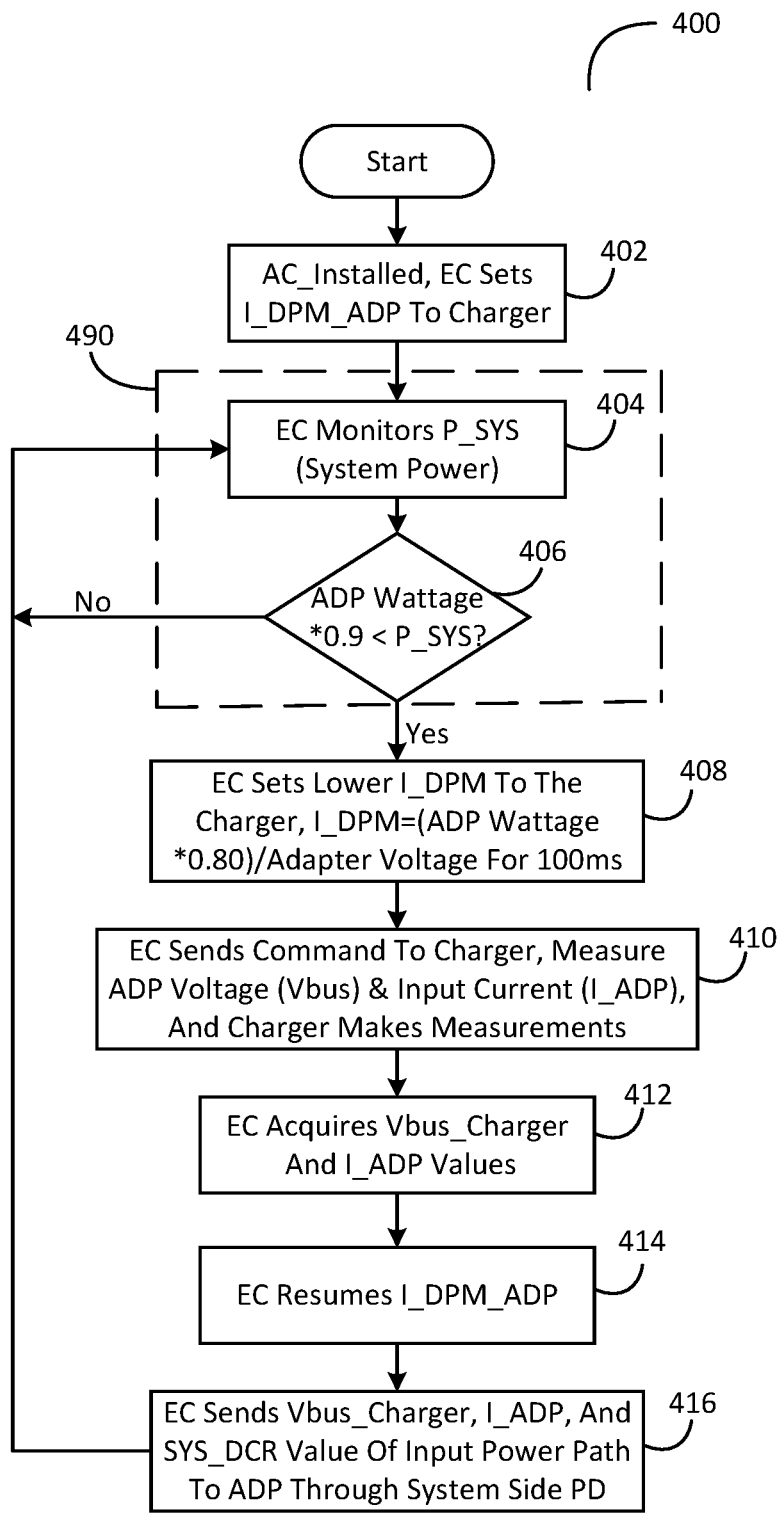
FIG. 4 illustrates methodology according to one exemplary embodiment of the disclosed systems and methods.

As described further in relation to FIG. 4 herein, values of input voltage (Vbus_charger) and AC adapter current (I_ADP) may be measured by charger 160 during a steady state condition of input current and voltage provided across power supply cable 190 to charger 160. This steady state condition may be achieved, for example, by using EC 183 to lower system charger input current limit (e.g., dynamic power management (DPM) current limit value (I_DPM_ADP)) below the normal system charger input current limit as necessary so that the lower system charger input current limit is less than the required current corresponding to the actual system power demand (e.g., Psys) to achieve a static (constant or stable) DC input current state from power supply cable 190. In one embodiment, this steady state condition may be achieved in a manner that is transparent to a user of information handling system 100 by using current from system battery 165 to supplement current from power supply cable 190 to meet dynamic power/current demands of system 100 that exceed the current limit specified by the lower system charger input current limit during Vbus_charger and I_ADP data measurement. In such an embodiment, the system end user will not see an impact on performance of information handling system 100 during measurement.

For example, a programmable integrated circuit of EC 183 may be programmed to determine if the monitored real time value of system power from the Psys signal corresponds to a power value that is greater than a defined threshold ($P_{TH}$), e.g., such as a value of $P_{TH}$ that is equal to 90% (or any other selected percentage less than 100%) of the maximum output power limit (P_ADPMAX) of AC adapter 154 (e.g., which is known by EC 183 as the dynamic power management (DPM) current limit value (I_DPM_ADP) that was previously provided to charger 160 by EC 183). In such a case, if the monitored real time value of system power from the Psys signal is greater than $P_{TH}$, then the programmable integrated circuit of EC 183 may act to lower the input current limit of the charger 160 to a new temporary current limit value I_DPM_ADP2 corresponding to 80% (or any other selected percentage less than the percentage used to determine $P_{TH}$) of the adapter maximum output power rating (P_ADPMAX) or I_DPM_ADP of AC adapter 154 so that battery 165 provides the balance of supplemental power to support the remainder of the total information handling system power demand. In this condition, the input voltage and input current of the charger 160 is in steady state for the specified temporary time (e.g., 100 milliseconds or other selected greater or lesser temporary time) with battery 165 supplying current to handle any system current consumption fluctuations. During this time, EC 183 can measure stable values of input voltage (Vbus_charger) and input AC adapter current data (I_ADP).

Figure 2B:
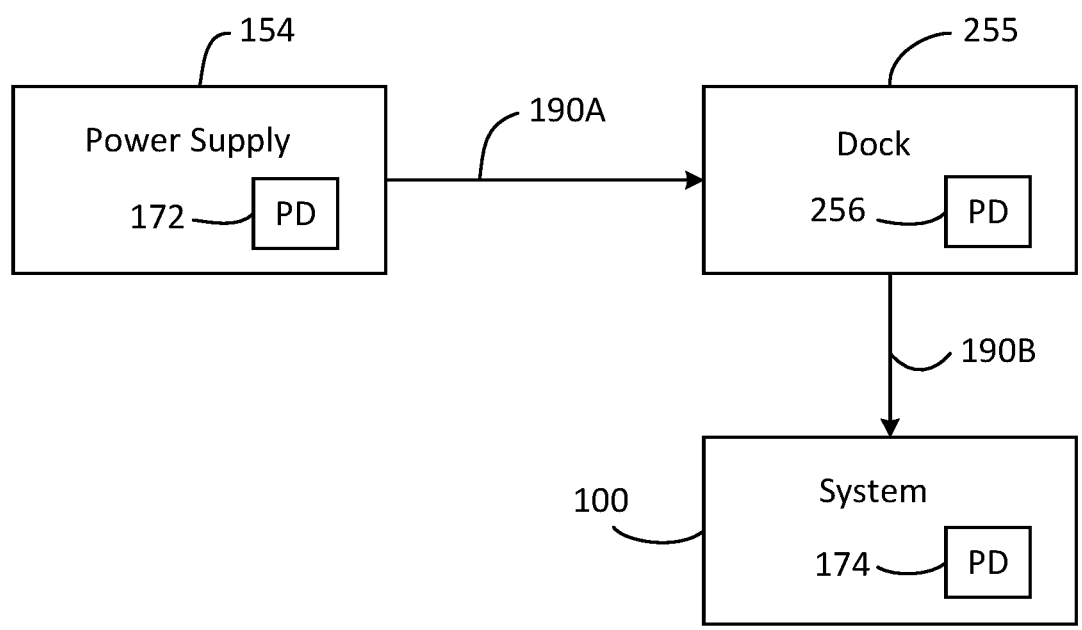
FIG. 2B is a block diagram illustrating a computer docking station coupled in series between a power supply and an information handling system by power supply cables according to one exemplary embodiment of the disclosed systems and methods.

As illustrated in the alternative embodiment of FIG. 2B, a computer docking station ("dock") 255 may be coupled in series between a power supply (e.g., AC adapter) 154 and information handling system 100. As shown in FIG. 2B, a first power supply cable 190A (e.g., having length of 1.8 meters or greater) is coupled between AC adapter 154 and computer docking station 255, and a second power supply cable 190B (e.g., having length of one meter or greater) is coupled between computer docking station 255 and information handling system 100. In such an alternate embodiment, the above described real time data may be provided across the CC conductor of power supply cable 190B from system-side power delivery programmable integrated circuit 174 to an optional dock power delivery (PD) programmable integrated circuit 256, and/or may be transferred through the computer docking station to the power supply-side power delivery (PD) programmable integrated circuit 172, e.g., such as in a case where computer docking station 255 does not have a dock power delivery (PD) programmable integrated circuit. In this alternate embodiment, dock power delivery (PD) programmable integrated circuit 256 may use this received real time data to calculate the resistance of the Vbus conductor/s of the power supply cable as described further herein for power supply-side power delivery (PD) programmable integrated circuit 172.

Figure 3:
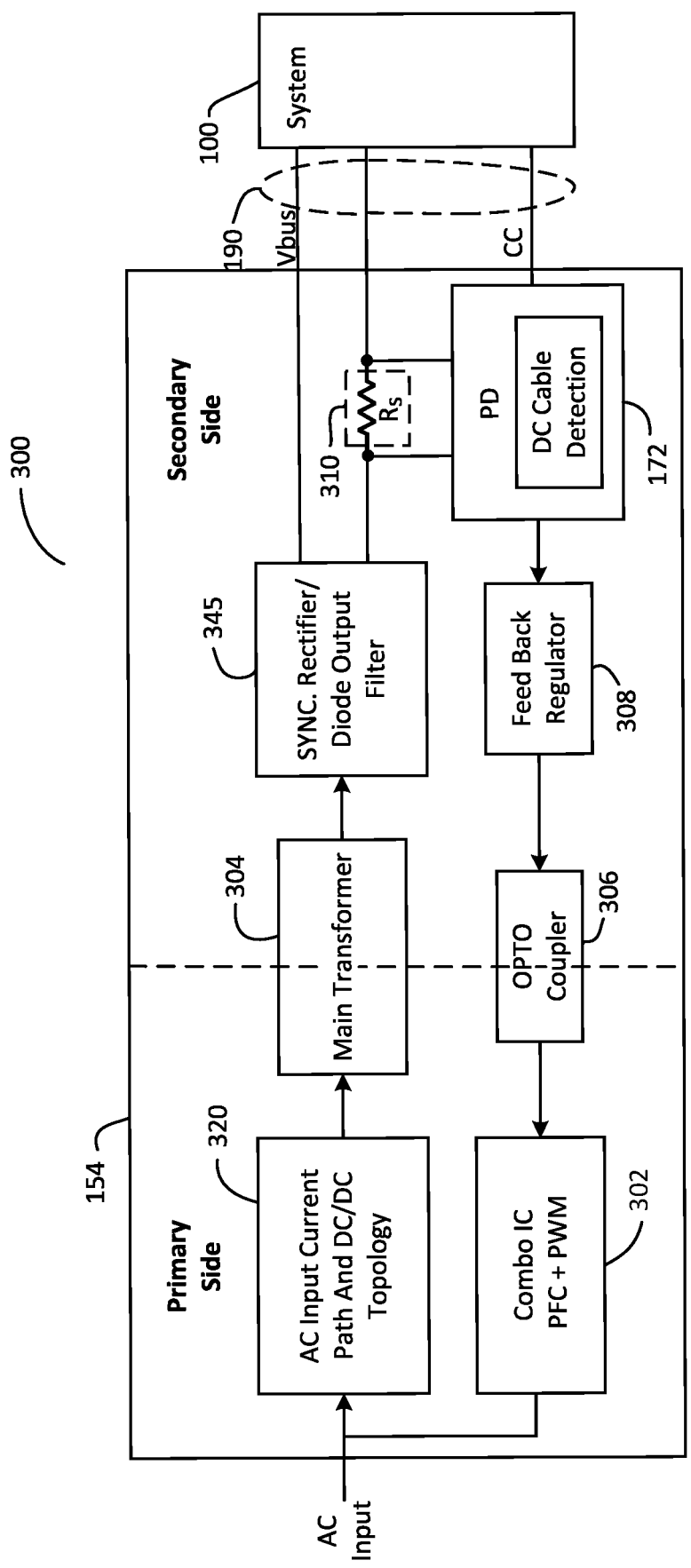
FIG. 3 illustrates selected components of a power supply coupled by a power supply cable to an information handling system.

FIG. 3 is a block diagram illustrating one exemplary embodiment 300 of selected components of power supply 154 (e.g., in this case a USB Type C AC adapter) coupled by power supply cable 190 to information handling system 100. As shown, AC adapter 154 includes a primary side 330 coupled to a secondary side 340 by a main transformer 304 having primary windings present on primary side 330 and secondary windings present on secondary side 340. As shown, the primary side of AC adapter 154 is coupled to receive AC input power, e.g., from AC mains 150 of FIG. 1. In this embodiment, primary side 330 includes a controller 302 that, among other things, may be configured for monitoring an open circuit or short circuit condition in the input current path of the primary side of AC adapter 154, e.g., to allow controller 302 to shut down or otherwise alter operation of AC adapter 154 based on monitored input current condition. Examples of other components that may be present in the primary-side of AC adapter 154 include AC input current path and DC/DC topology components 320 configured to provide DC power to primary side windings of main transformer 304. Possible configuration and operation of AC input current path and DC/DC topology components 320 of primary side 330 are described, for example, in U.S. Pat. No. 9,466,974 which is incorporated herein by reference in its entirety for all purposes.

Still referring to FIG. 3, secondary side 340 of AC adapter 154 includes secondary windings of main transformer 304 which supply DC output (O/P) and ground (GND) to Vbus of power supply cable 190, e.g., via a synchronous rectifier/diode output filter 345 such as described in U.S. Pat. No. 9,466,974 which is incorporated herein by reference in its entirety for all purposes. Feedback regulator circuitry 308 is coupled to monitor DC output (O/P) to Vbus as shown, and may be configured to provide an optical switcher control signal across optocoupler 306 to controller 302 such as described in U.S. Pat. No. 9,466,974 which is incorporated herein by reference in its entirety for all purposes.

As further illustrated in FIG. 3, power supply-side power delivery (PD) programmable integrated circuit 172 is provided in secondary side 340 of power supply 154 (in this case a USB Type C PD microcontroller) that is coupled by the CC conductor of power supply cable 190 to USB Type C PD microcontroller 174. Power supply-side USB Type C PD microcontroller 172 is also coupled as shown to feedback regulator 308, and is coupled to measure Vbus current across sense resistor ($R_S$) 310 in the ground conductor. As shown, power supply-side USB Type C PD microcontroller 172 is programmed to execute DC cable detection logic 320, e.g., to perform the tasks such as described in relation to FIGS. 5 and 6 herein.

As described further herein, DC cable detection logic 320 may execute on power supply-side PD microcontroller 172 to monitor DC cable resistance of power supply cable 190 in real time. Once the adapter power profile is switched by the DC cable detection circuit 320, DC cable detection circuit 320 may control AC adapter rating power to map the power profile it chooses to the measured DC cable resistance of power supply cable 190, e.g., through a smart algorithm computation described herein (e.g., such as in FIG. 6 herein). In one exemplary embodiment, when the AC adapter 154 cannot operate properly with the power profile needed or set by DC cable detection circuit 320 based on the monitored DC cable resistance of power supply cable 190, power supply-side PD microcontroller 172 may control AC adapter 154 to go into a protection latch-off mode to avoid any abnormal condition that may occur to damage the AC adapter 154.

FIG. 4 illustrates one exemplary embodiment of methodology 400 that may be implemented by programmable integrated circuits (e.g., EC 183, charger 160, and power supply-side USB Type C PD microcontroller 172). Although described in relation to the AC adapter and information handling system components of the exemplary embodiment of FIGS. 1-3, it will be understood that the methodology 400 of FIG. 4 may be implemented with other combinations of power supply, computer system dock, and/or information handling system components that are coupled together by one or more power supply cables.

As shown, methodology 400 of FIG. 4 starts in block 402 where AC adapter 154 is installed and coupled to supply power through power supply cable 190 to information handling system 100. In block 402, EC 183 sets a dynamic power management (DPM) current limit value (I_DPM_ADP), and provides this current limit value (I_DPM_ADP) to charger 160. The value of I_DPM_ADP (e.g., such as 4.5 amps) may be selected by EC 183 based on a power/current profile previously provided from power supply-side PD 172 to system-side PD 174. Such a power/current profile may be a power profile that indicates one or more combinations of available voltage and current that power supply 154 is capable of delivering to information handling system 100. One example of a standard power profile (PDO) may be so provided includes the following available voltage/current combinations: 5 volts/3 amps, 9 volts/3 amps, 15 volts/3 amps, 20 volts/4.5 amps. The value of I_DPM_ADP is an input current value that corresponds to a maximum adapter output power limit (P_ADPMAX) that is set for AC adapter 154 by charger 160 based on the provided power/current profile from power supply-side PD 172. In this regard, charger 160 responds to this I_DPM_ADP value from EC 183 by limiting Vbus current input from Vbus of power supply cable 190 to this provided I_DPM_ADP value (and therefore limiting power input from Vbus to P_ADPMAX), and providing any needed additional current in real time from battery 165 whenever information handling system requires a total current draw that is greater than the specified I_DPM_ADP current limit.

Next, in block 404, EC 183 monitors real time value of total platform or system power consumption (Psys) of information handling system 100 that is provided from charger 160 to EC 183 across data communication bus 185. Then in block 406, EC 183 compares the real time value of system power consumption (Psys) from block 404 to the defined threshold ($P_{TH}$). As an example, in one embodiment, a value of $P_{TH}$ may be selected to be equal to 90% of the maximum adapter output power limit (P_ADPMAX) set for AC adapter 154 by EC 183 (as I_DPM_ADP) in block 402. If in block 406 the real time total system power Psys is found to be less than or equal to $P_{TH}$, then methodology 400 returns to block 404 and repeats as shown.

However, if in block 406 the real time total system power Psys is found to be greater than $P_{TH}$, then methodology 400 proceeds to block 408 where EC sends a command to charger 160 to implement temporary and lower new value of I_DPM_ADP as I_DPM_ADP2. The new I_DPM_ADP2 value is lower than the original value of I_DPM_ADP, for example, I_DPM_ADP2 may be set, for example, to be equal to 80% of the maximum adapter output power limit (P_ADPMAX) that was set by EC 183 as I_DPM_ADP in block 402. Duration of the new I_DPM_ADP2 value may be any selected temporary measurement time period that is long enough to persist only during the performance of the following blocks 410 and 412 of methodology 400, e.g., such as 100 milliseconds or any other suitable selected greater or lesser time period. It will be understood that the tasks of blocks 404 and 406 are optional (as indicated by the dashed line 490), and that in another embodiment, methodology 400 may proceed from block 402 directly to block 408, i.e., without performance of blocks 404 and 406.

Next, in block 410, EC 183 sends a command to charger 160 to measure input DC voltage (Vbus_charger) received at system 100 from Vbus of power supply cable 190 and input DC current (I_ADP) received at system 100 from Vbus of power supply cable 190, and charger 160 responds by making these measurements while the temporary lower I_DPM_ADP2 is operative. In block 412, EC 183 acquires the measured stable Vbus_charger and I_ADP values from charger 160. After expiration of the temporary measurement time period, EC 183 sends a command in block 414 to charger 160 to resume the higher original value of I_DPM_ADP that was originally set by EC 183 in block 402. Then, in block 416, EC 183 sends the measured stable values of Vbus_charger and I_ADP (together with SYS_DCR resistance value of information handling system input power path 210) via system-side power supply-side power delivery (PD) programmable integrated circuit 174 across CC of power supply cable 190 to power supply-side power delivery (PD) programmable integrated circuit 172. Methodology 400 then returns to block 404 and repeats as shown, or returns to block 408 and repeats in the case that optional blocks 404 and 406 are omitted.

Figure 5:
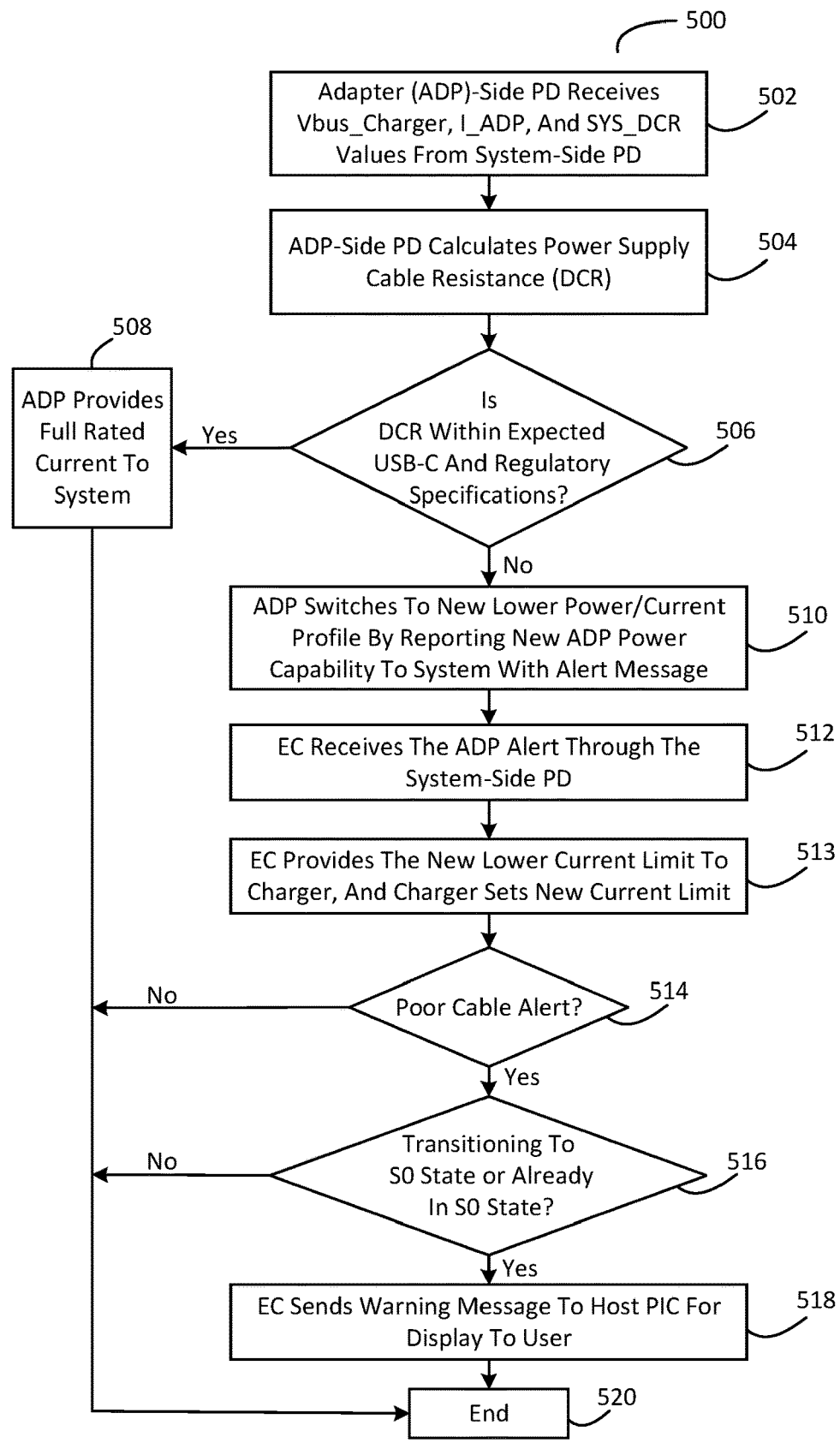
FIG. 5 illustrates methodology according to one exemplary embodiment of the disclosed systems and methods.

FIG. 5 illustrates one exemplary embodiment of methodology 500 that may be implemented by programmable integrated circuits of AC adapter 154 and information handling system 100. Although described in relation to the AC adapter and information handling system components of the exemplary embodiment of FIGS. 1-3, it will be understood that the methodology 500 of FIG. 5 may be implemented with other combinations of power supply, computer system dock, and/or information handling system components that are coupled together by one or more power supply cables.

As shown, methodology 500 of FIG. 5 starts in block 502 where power supply-side power delivery (PD) programmable integrated circuit 172 of AC adapter 154 is initially operating with a first current/power profile that has been previously established by reporting a first adapter power source capability to system EC 183 via system-side power supply-side PD 174 across CC of power supply cable 190. Such a first current/power profile and corresponding first adapter power source capability may correspond to an expected USB C cable specification and regulatory specification for resistance of the attached cable 190 (e.g., as specified by E-marker or non-E-marker of the cable 190). EC 183 communicates an I_DPM_ADP value corresponding to this first current/power profile to charger 160 which responds by setting a maximum adapter output power limit (P_ADPMAX).

In block 502 of methodology 500, power supply-side power delivery (PD) programmable integrated circuit 172 of AC adapter 154 receives the measured stable values of Vbus_charger and I_ADP (together with SYS_DCR resistance value of information handling system input power path 210) of block 416 across CC of power supply cable 190 from system-side power supply-side power delivery (PD) programmable integrated circuit 174. Then in block 504, power supply-side PD integrated circuit 172 of AC adapter 154 calculates DC resistance (DCR) of the power supply cable (or Cable_DCR) 190 from the known (e.g., measured) value of Vbus voltage at the AC adapter 154 (V_ADP) together with the received stable values of Vbus_charger and I_ADP, and the SYS_DCR resistance of system power path 210, e.g., using the following equation:

DC resistance (DCR) or Cable_DCR of the power supply cable=(Total Resistance between Adapter and Charger)−(Resistance of System Input Power Path (SYS_DCR));

or

Cable_DCR of power supply cable=[(V_ADP−Vbus_ charger)/I_ADP]−(SYS_DCR)

Figure 6:
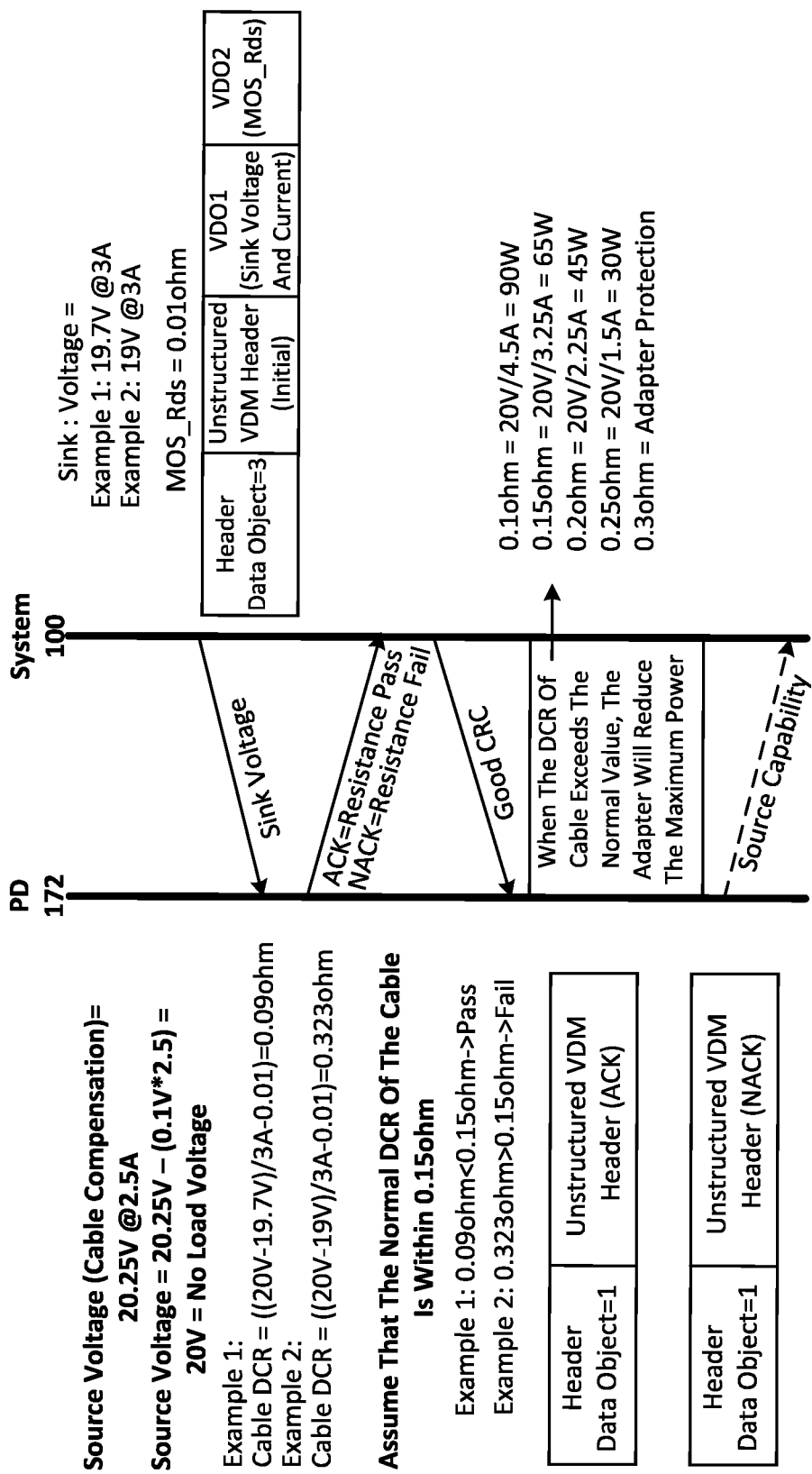
FIG. 6 illustrates an event sequence according to one exemplary embodiment of the disclosed systems and methods.

Next, in block 506, power supply-side PD integrated circuit 172 of AC adapter 154 determines if the calculated DC resistance (DCR) of the power supply cable 190 from block 504 falls within the expected USB C cable specification and regulatory specification for resistance of the attached cable 190 (e.g., as specified by E-marker or non-E-marker of the cable 190). One example of such an expected power supply cable DC resistance is less than a predefined threshold DC resistance value of 0.15 ohms as illustrated in the example of FIG. 6, although it will be understood that this example expected resistance value is exemplary only and that a predefined threshold DC resistance value may be greater than or less than 0.15 ohms in other embodiments.

If the calculated DC resistance (DCR) of the power supply cable 190 is found in block 506 to be within the expected (or normal) power supply cable resistance, then AC adapter 154 can safely provide full rated current to the attached system 100 and methodology 500 therefore proceeds to block 508 where power supply-side PD integrated circuit 172 commands controller 302 of AC adapter 154 (via feedback regulator 308 and across optocoupler 306) to provide full rated DC current across power supply cable 190 to system 100, and then ends in block 520. An example is illustrated in the exemplary embodiment of FIG. 6, where power supply-side PD integrated circuit 172 controls AC adapter 154 to supply its full rated current capability value (e.g., 4.5 amps corresponding to 90 watts power in this example) when the DCR of the power supply cable 190 is found to be 0.1 ohms, which is less than the exemplary expected resistance value (e.g., ohms) of this example.

However, if the calculated DC resistance (DCR) of the power supply cable 190 is found in block 506 to be greater than the expected power supply cable resistance, then methodology 500 proceeds to block 510 where power supply-side PD integrated circuit 172 switches to a predefined second and different lower (i.e., downsized) current/power profile by reporting a second and lower adapter power source capability to system-side power supply-side PD 174 across CC of power supply cable 190, together with an alert message (e.g., a "poor cable" alert message) indicating that DCR of the power supply cable 190 is greater than expected.

In one embodiment of block 510, power supply-side PD integrated circuit 172 may control the AC adapter 154 to enter a Protection Mode if the calculated DCR of the power supply cable 190 from block 506 exceeds a maximum-allowable power supply DCR (in which case the AC adapter 154 switches its output current and power to OFF) and power supply-side PD integrated circuit 172 reports loss of all adapter power source capability to system-side power supply-side PD 174 across CC of power supply cable 190, together with a "poor cable" alert message indicating that DCR of the power supply cable 190 is greater than expected.

An example is illustrated in the exemplary embodiment of FIG. 6, where power supply-side PD integrated circuit 172 controls AC adapter 154 to supply a predefined reduced rated current capability value when the DCR of the power supply cable 190 is found to be greater than or equal to the exemplary expected resistance value (e.g., 0.15 ohms) of this example. As illustrated in FIG. 6, power supply-side PD integrated circuit 172 may select a predefined reduced rated current capability value according to the magnitude of the calculated DCR of the power supply cable 190, e.g., by selecting the predefined reduced rated current capability value from a lookup table of current/power profiles maintained in non-volatile memory of the power supply-side PD integrated circuit 172 such as illustrated for selected power supply DC cable values in Table 1 below. It will be understood that the particular value/s of each row in Table 1 (and the number of rows of values in Table 1) are exemplary only, and that other values (and/or additional intervening rows of values between the rows of Table 1) may be provided as needed or desired to fit a given configuration of power supply, power supply cable, and/or information handling system.

TABLE 1

| Calculated DCR of Power Supply Cable/s | Power Supply Voltage/ Current Capability Values | Power Supply Power Capability Value |
|---|---|---|
| 0.1 ohm | 20 volts/4.5 amps | 90 watts |
| 0.15 ohm | 20 volts/3.25 amps | 65 watts |
| 0.2 ohm | 20 volts/2.25 amps | 45 watts |
| 0.25 ohm | 20 volts/1.5 amps | 30 watts |
| 0.3 ohm | Protection Mode | Protection Mode |

In block 512, EC 183 of system 100 receives the alert message with the second and lower adapter power source capability of block 510, and in block 513 EC 183 communicates a new I_DPM_ADP value corresponding to the second and lower adapter power source capability to charger 160 which responds by setting a new and lower maximum adapter output power limit (P_ADPMAX) that is within the second and lower adapter power source capability. EC 183 may also communicate the second and lower power source capability to host programmable integrated circuit 105 via PCH 106 for adjustment of power parameters of host programmable integrated circuit 105. In this way, the power supply-side PD integrated circuit 172 performs real-time voltage compensation according to the measured actual power supply cable resistance and current output, e.g., as needed to avoid a disconnection issue resulting from under-voltage protection (UVP) operation of system-side PD 174.

Next, in block 514, EC 183 parses the alert message to determine if it the received alert message of block 512 is a "poor cable" alert message. If not, then methodology 514 ends in block 520. However, if EC 183 determines in block 514 that the received alert message of block 512 is a "poor cable" alert message, then methodology 500 proceeds to block 516, where EC 183 determines if system 100 is either currently operating in an Advanced Configuration and Power Interface (ACPI) "S0" working state (with Host PIC 105 (e.g., CPU) running and executing instructions) or is in the process of transitioning to a S0 working state from another state (e.g., S1, S2, S3, S4 or S5) in which the Host PIC 105 (e.g., CPU) is not running and executing instructions. If EC 183 determines in block 516 that system 100 is not currently operating in (or transitioning to) a S0 working state, then methodology 500 ends in block 520 with system 100 in a non-working S1, S2, S3, S4 or S5 state. However, if EC 183 determines in block 516 that system 100 is currently operating in (or transitioning to) a S0 working state, then methodology 500 proceeds to block 518 where EC sends the "poor cable" alert to Host PIC 105 (e.g., CPU) to cause Host PIC 105 to provide a warning (e.g., to display a warning message) to the user on display 125 of information handling system 100, e.g., as a popup message either on an OS runtime screen of display 125 during S0 state or on a system BIOS boot screen during transition from non-working state (S1, S2, S3, S4 or S5 state) to the S0 working state. In one exemplary embodiment, such a popup message may include a warning that high DC resistance of the existing DC power supply cable/s may cause a future voltage regulation failure at the system side under higher dynamic system power load and that the existing DC power supply cable/s should be replaced with different DC power supply cables having a lower resistance, e.g., prompting the user to replace the current DC power supply cable/s with DC power supply cable/s having lower resistance and thus preventing a future system failure. The system user may then take steps to correct the out-of-specification high power supply cable resistance, e.g., such as by replacing the currently attached power supply cable 190 with a new power supply cable that meets the expected USB C cable specification and regulatory specification for resistance (e.g., as specified by E-marker or non-E-marker of the cable 190) Methodology 500 then ends in block 520.

FIG. 6 illustrates one exemplary embodiment of an event sequence 600 that may occur in the practice of the disclosed systems and methods by a power supply 154 (i.e., "Source") coupled to supply power across a power supply cable 190 to an information handling system 100 (i.e., "Sink"), e.g., using the methodologies of FIG. 4 and FIG. 5. It will be understood that prior to initiating the events of sequence 600, power supply-side PD programmable integrated circuit 172 may communicate a standard power profile (PDO) to system-side PD programmable integrated circuit 174 that includes the following available voltage/current combinations: 5 volts/3 amps, 9 volts/3 amps, 15 volts/3 amps, and 20 volts/4.5 amps. In FIG. 6, information and/or data communicated between Source side and Sink side may be transmitted across CC line of power supply cable 190.

As shown in FIG. 6, event sequence 600 starts when the Sink side (PD 174 of information handling system 100) sends "Sink messages" to the Source side (PD 172 of power supply 154), with these sink messages including input current (e.g., I_ADP) and input voltage (e.g., Vbus_charger) of AC side, and resistance (e.g., SYS_DCR) for input power path 210, which are used by the power supply PD 172 to calculate cable DCR for power supply cable 190. These actions correspond to block 416 of FIG. 4, and blocks 502 and 504 of FIG. 5. Next, Source side (PD 172 of power supply 154) sends an ACK or NACK message with DC cable resistance to the Sink side. The ACK or NACk message is a pass or failure status (as calculated by PC 172 of power supply 154), e.g., as per block 506 of FIG. 5. If the Source side (PD 172 of power supply 154) recognizes that the resistance of the power supply cable 190 exceeds expectations, the Source side carries out a hard reset and starts reporting another (i.e., downsized) source power capability to the Sink side (PD 174 of information handling system), as per block 510 of FIG. 5, in order to avoid safety issues. However, if the Source side (PD 172 of power supply 154) recognizes that the resistance of the power supply cable 190 meets expectations, it will not execute the hard reset and will not report another downsized source power capability to the Sink side (PD 174 of information handling system), as per block 508 of FIG. 5. Note that in sequence 600, both the Source side (PD 172 of power supply 154) and the Sink side (PD 174 of information handling system 100) will remain Good CRC when everything is on-check.

It will be understood that the identity and sequence of blocks of the methodologies shown and described herein are exemplary only, and that any combination of fewer, additional and/or alternative blocks may be employed that are suitable for determining electrical characteristic/s of one or more power supply cable/s that are coupled to supply power from a power supply to an information handling system, and to take one or more actions based on the determined electrical characteristic/s.

It will also be understood that one or more of the tasks, functions, or methodologies described herein (e.g., including those described herein for components 105, 106, 172, 174, 180, 183, 189. 256, 302, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more blocks of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more blocks of the present methodologies may be employed in one or more code segments of the computer program. For example, a code segment executed by the information handling system may include one or more blocks of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:
   selecting a specified temporary measurement time period;
   providing a direct current (DC) input power across one or more power supply cables to a system that comprises a battery that is electrically coupled to other components of the system, the DC input power meeting an existing total power consumption of the system;
   then establishing a steady state condition of a stable input voltage and a stable input current for the DC input power that is provided across the one or more power supply cables to the system for the selected specified temporary measurement time period during which the stable input current is less than the input current required to meet the existing total power consumption of the system by:
   temporarily limiting the input current of the DC input power that is provided to the system at the stable input voltage across the one or more power supply cables during a duration of the selected specified temporary measurement time period to a static and constant reduced input current level that is the stable input current and that is less than a necessary current value that is required to meet the existing total power consumption of the system, while at the same time using the battery of the system to provide the system with an additional amount of current from the system battery to supplement the static and constant reduced input current level provided from the power supply cables to produce the balance of the necessary current value that is required to meet the existing total power consumption of the system during the selected specified temporary measurement time period,
   then measuring the stable values of input voltage and input current during the duration of the selected specified temporary measurement time period, and
   then increasing the input current of the DC input power that is provided to the system across the one or more power supply cables to meet the existing total power consumption of the system after the expiration of the selected specified temporary measurement time period;
   using the measured stable values of the input voltage and the input current to determine real time electrical characteristics of the one or more power supply cables that are providing the DC input power to the system; and
   taking one or more actions based on the one or more determined electrical characteristics.

2. The method of claim 1, further comprising where the input voltage and input current of the DC input power that is provided across the one or more power supply cables to the system are unstable before the beginning of the selected specified temporary measurement time; where the establishing the steady state condition for the stable input voltage and the stable input current of the DC input power during the duration of the selected specified temporary measurement time further comprises:
  (a) operating a power supply to provide the DC input power across the one or more power supply cables to the system;
  (b) then measuring the existing real time total power consumption of the system while the power supply is providing the DC input power across the one or more power supply cables to the system;
  (c) then comparing the measured existing real time total power consumption of the system to a defined power threshold of less than 100% of a maximum output power limit of the power supply; and
  (d) then performing the following:
    if the measured existing real time total power consumption is greater than the defined power threshold of the maximum output power limit of the power supply, then performing the establishing of the steady state condition of the stable input voltage and the stable input current for the DC input power that is provided across the one or more power supply cables to the system for the selected specified temporary measurement time period, and
    if the measured existing real time total power consumption is less than or equal to the defined power threshold of the maximum output power limit of the power supply, then returning to block (b) and repeating blocks (b) to (d).

3. The method of claim 1, where the determined real time electrical characteristics comprise a determined DC electrical resistance value of the one or more power supply cables; and where the method further comprises:
  determining whether the determined DC electrical resistance value of the one or more power supply cables is less than a predefined threshold DC resistance value; and
  where the taking one or more actions based on the one or more determined electrical characteristics comprises taking at least one action comprising:
    operating a power supply to provide a first current value corresponding to a first power capability of the power supply across the one or more power supply cables to the system only if the determined DC electrical resistance value of the one or more power supply cables is less than the predefined threshold DC resistance value, and
    operating the power supply to provide a second current value that is lower than the first current value and that corresponds to a selected second power capability that less is less than the first power capability of the power supply across the one or more power supply cables to the system only if the determined DC electrical resistance value of the one or more power supply cables is greater than or equal to the predefined threshold DC resistance value.

4. The method of claim 3, where the taking one or more actions based on the one or more determined electrical characteristics comprises taking at least one action that comprises providing a warning to a human user of the system that warns the human user that the DC electrical resistance value of the one or more power supply cables is greater than expected.

5. The method of claim 3, further comprising receiving the DC input power at a battery charger and power circuit of the system via a system input power path of the system; and where the using the measured stable values of the input voltage and the input current to determine real time electrical characteristics of the one or more power supply cables comprises:
  performing the measuring of the stable values of input voltage and input current of the DC input power at the battery charger and power circuit of the system during the selected specified temporary measurement time period; and
  determining the DC electrical resistance value of the one or more power supply cables as a difference between a resistance of the system input power path and a determined total resistance between the power supply and the battery charger and power circuit of the system;
  where the total resistance between the power supply and the battery charger and power circuit of the system is determined by:
    calculating a voltage difference between a value of a voltage provided by the power supply to the one or more DC power supply cables and the stable value of input voltage of the DC input power measured at the battery charger and power circuit of the system, and
    dividing the calculated voltage difference by the stable value of input current of the DC input power measured at the battery charger and power circuit of the system.

6. The method of claim 5, further comprising:
  providing the measured stable values of input voltage and input current of the DC input power across a communication bus of the one or more power supply cables from at least one first programmable integrated circuit of the system to at least one second programmable integrated circuit of the power supply;
  using the at least one second programmable integrated circuit of the power supply to perform the determining of the DC electrical resistance value of the one or more power supply cables;
  using the at least one second programmable integrated circuit of the power supply to perform the determining of whether the determined DC electrical resistance value of the one or more power supply cables is less than the predefined threshold DC resistance value; and
  using the at least one second programmable integrated circuit of the power supply to perform the taking of the at least one action.

7. The method of claim 6, where the using the at least one second programmable integrated circuit of the power supply to perform the taking of the at least one action further comprises providing an identity of the selected second power capability across the communication bus of the one or more power supply cables from the at least one second programmable integrated circuit of the power supply to the at least one first programmable integrated circuit of the system; and where the method further comprises:
  using the at least one first programmable integrated circuit of the system to respond to receipt of the identity of the selected second power capability by causing the battery charger and power circuit of the system to select a system charger input current limit based on the identity of the selected second power capability for operating power delivery to power-consuming components of the system.

8. The method of claim 6, where the using the at least one second programmable integrated circuit of the power supply to perform the taking of the at least one action further comprises providing an alert across the communication bus of the one or more power supply cables from the at least one second programmable integrated circuit of the power supply to the at least one first programmable integrated circuit of the system, the alert indicating that the DC electrical resistance value of the one or more power supply cables is greater than expected; and where the method further comprises using the at least one first programmable integrated circuit of the system respond to receipt of the alert by:

parsing the alert received from the at least one second programmable integrated circuit of the power supply to determine if the alert indicates that the DC electrical resistance value of the one or more power supply cables is greater than expected; and then, only if it is determined that the alert indicates that the DC electrical resistance value of the one or more power supply cables is greater than expected, providing a warning to a human user of the system that warns the human user that the DC electrical resistance value of the one or more power supply cables is greater than expected.

9. The method of claim 6, where the one or more power supply cables each comprises a USB Type-C power supply cable; and where each of the at least one first programmable integrated circuit of the system and the at least one second programmable integrated circuit of the power supply comprise a USB Type C power delivery (PD) controller.

10. The method of claim 1, where the one or more power supply cables comprise a first power supply cable coupled from a power supply to a computer docking station, and a second power supply cable coupled from the computer docking station to the system.

11. A system, comprising:

a first system electrically coupled to receive direct current (DC) input power that meets an existing total power consumption of the system across one or more power supply cables from a second system that is a power supply, the first system comprising a battery that is electrically coupled to other components of the system;

where the first system comprises at least one first programmable integrated circuit programmed to establish a steady state condition of a stable input voltage and a stable input current for the DC input power that is provided across the one or more power supply cables to the system for the selected specified temporary measurement time period during which the stable input current is less than the input current required to meet the existing total power consumption of the system by:

temporarily limiting the input current of the DC input power that is provided to the system at the stable input voltage across the one or more power supply cables during a duration of the selected specified temporary measurement time period to a static and constant reduced input current level that is the stable input current and that is less than a necessary current value that is required to meet the existing total power consumption of the system, while at the same time using the battery of the system to provide the system with an additional amount of current from the system battery to supplement the static and constant reduced input current level provided from the power supply cables to produce the balance of the necessary current value that is required to meet the existing total power consumption of the system during the selected specified temporary measurement time period, then measuring the stable values of input voltage and input current during the duration of the selected specified temporary measurement time period, and then increasing the input current of the DC input power that is provided to the system across the one or more power supply cables to meet the existing total power consumption of the system after the expiration of the selected specified temporary measurement time period;

where the power supply comprises at least one second programmable integrated circuit programmed to use the measured stable values of the input voltage and the input current to determine real time electrical characteristics of the one or more power supply cables that are providing the DC input power to the first system; and where at least one of the first programmable integrated circuit or second programmable integrated circuit is programmed to take one or more actions based on the one or more determined electrical characteristics.

12. The system of claim 11, where the at least one first programmable integrated circuit of the first system is programmed to establish the steady state condition of the stable input voltage and the stable input current for the DC input power during the duration of the selected specified temporary measurement time and while the power supply is providing the DC input power across the one or more power supply cables to the first system by:

(a) measuring the existing real time total power consumption of the first system while the power supply is providing the DC input power across the one or more power supply cables to the first system;

(b) then comparing the measured existing real time total power consumption of the first system to a defined power threshold of less than 100% of a maximum output power limit of the power supply; and (c) then performing the following:

if the measured existing real time total power consumption is greater than the defined power threshold of the maximum output power limit of the power supply, then performing the establishing of the steady state condition of the stable input voltage and the stable input current for the DC input power that is provided across the one or more power supply cables to the first system for the selected specified temporary measurement time period, and if the measured existing real time total power consumption is less than or equal to the defined power threshold of the maximum output power limit of the power supply, then returning to block (a) and repeating blocks (a) to (c).

13. The system of claim 11, where the determined real time electrical characteristics comprise a determined DC electrical resistance value of the one or more power supply cables; and where the at least one second programmable integrated circuit of the power supply is programmed to:

determine whether the determined DC electrical resistance value of the one or more power supply cables is less than a predefined threshold DC resistance value; and take at least one action based on the one or more determined electrical characteristics, the at least one action comprising:

operating the power supply to provide a first current value corresponding to a first power capability of the power supply across the one or more power supply cables to the first system only if the determined DC electrical resistance value of the one or more power supply cables is less than the predefined threshold DC resistance value, and operating the power supply to provide a second current value that is lower than the first current value and that corresponds to a selected second power capability that less is less than the first power capability of the power supply across the one or more power supply cables to the first system only if the determined DC electrical resistance value of the one or more power supply cables is greater than or equal to the predefined threshold DC resistance value.

14. The system of claim 13, where the one or more actions based on the one or more determined electrical characteristics further comprise providing a warning to a human user of the first system that warns the human user that the DC electrical resistance value of the one or more power supply cables is greater than expected.

15. The system of claim 13, where the first system further comprises:
 a battery charger and power circuit coupled to a battery and coupled to the one or more power supply cables via a system input power path of the first system;
 where the at least one first programmable integrated circuit of the first system is programmed to measure the stable values of input voltage and input current of the DC input power at the battery charger and power circuit of the first system;
 where the at least one second programmable integrated circuit of the power supply is programmed to determine the DC electrical resistance value of the one or more power supply cables as a difference between a resistance of the system input power path and a determined total resistance between the power supply and the battery charger and power circuit of the first system; and
 where the at least one second programmable integrated circuit of the power supply is programmed to determine the total resistance between the power supply and the battery charger and power circuit of the first system by:
  calculating a voltage difference between a value of a voltage provided by the power supply to the one or more DC power supply cables and the stable value of input voltage of the DC input power measured at the battery charger and power circuit of the first system, and
  dividing the calculated voltage difference by the stable value of input current of the DC input power measured at the battery charger and power circuit of the first system.

16. The system of claim 15, where the at least one first programmable integrated circuit of the first system is programmed to provide the measured stable values of input voltage and input current of the DC input power across a communication bus to the at least one second programmable integrated circuit of the power supply; and where the at least one second programmable integrated circuit of the power supply is programmed to:
 determine the DC electrical resistance value of the one or more power supply cables;
 determine whether the determined DC electrical resistance value of the one or more power supply cables is less than the predefined threshold DC resistance value; and
 take the at least one action.

17. The system of claim 16, where the at least one second programmable integrated circuit of the power supply is programmed to provide an identity of the selected second power capability across the communication bus of the one or more power supply cables from the at least one second programmable integrated circuit of the power supply to the at least one first programmable integrated circuit of the first system; and
 where the at least one first programmable integrated circuit of the system is programmed to respond to receipt of the identity of the selected second power capability by causing the battery charger and power circuit of the first system to select a system charger input current limit based on the identity of the selected second power capability for operating power delivery to power-consuming components of the first system.

18. The system of claim 16, where the at least one second programmable integrated circuit of the power supply is programmed to provide an alert across the communication bus of the one or more power supply cables from the at least one second programmable integrated circuit of the power supply to the at least one first programmable integrated circuit of the first system, the alert indicating that the DC electrical resistance value of the one or more power supply cables is greater than expected; and where the at least one first programmable integrated circuit of the first system is programmed to respond to receipt of the alert by:
 parsing the alert received from the at least one second programmable integrated circuit of the power supply to determine if the alert indicates that the DC electrical resistance value of the one or more power supply cables is greater than expected; and
 then, only if it is determined that the alert indicates that the DC electrical resistance value of the one or more power supply cables is greater than expected, providing a warning to a human user of the first system that warns the human user that the DC electrical resistance value of the one or more power supply cables is greater than expected.

19. The system of claim 11, where the one or more power supply cables each comprises a USB Type-C power supply cable; and where each of the at least one first programmable integrated circuit of the first system and the at least one second programmable integrated circuit of the power supply comprise a USB Type C power delivery (PD) controller.

20. The system of claim 11, where the one or more power supply cables comprise a first power supply cable coupled from a power supply to a computer docking station, and a second power supply cable coupled from the computer docking station to the first system.

* * * * *